3,004,891

STABLE, AQUEOUS SOLUTIONS OF SODIUM PHOSPHITE, SODIUM FORMALDEHYDE SULFOXYLATE, AND DIHYDROSTREPTOMYCIN SULFATE

William W. Armstrong, Oyster Bay, N.Y., assignor to Chas. Pfizer & Co., Inc., Brooklyn, N.Y., a corporation of Delaware
No Drawing. Filed Sept. 17, 1959, Ser. No. 840,503
6 Claims. (Cl. 167—65)

The present invention relates to pharmaceutical preparations for parenteral use. Specifically, it is an aqueous solution containing as a therapeutically active substance dihydrostreptomycin sulfate. This application is a continuation in part of my copending application Serial No. 668,324, filed June 27, 1957, now abandoned, and assigned to the same assignee as the present invention.

Various methods have been used in the past to stabilize parenteral aqueous solutions of dihydrostreptomycin sulfate. However, none of these methods has produced solutions having adequate heat stability. It is an object of this invention to prepare an aqueous solution of dihydrostreptomycin sulfate which may be subjected to high temperatures for a protracted period of time without resulting in decrease in potency or in the development of objectionable colors.

It has been discovered that when aqueous solutions of dihydrostreptomycin sulfate have added thereto sodium phosphite (i.e. $Na_2HPO_3$) and sodium formaldehyde sulfoxylate the product possesses outstanding heat stability.

A high degree of stability to elevated temperatures has a number of advantages. The solution may be heat sterilized without undue loss of potency and darkening, this method often being more desirable than sterilization by filtration and packing under sterile conditions. Protection of color and stability at elevated temperatures encountered in transit and during storage, particularly in tropical areas, is assured.

The concentration of each agent in the solution varies with the individual compound. For example, the concentration of sodium phosphite (as the anhydrous salt) should be approximately 1–8% w./v. of the solution. (The sodium phosphite will normally be employed as the readily available pentahydrate.) The concentration of sodium formaldehyde sulfoxylate should be about 0.1–0.8% w./v. of the solution and preferably about 0.3–0.5%. The concentration of the dihydrostreptomycin sulfate should be in the range usually employed in parenteral dosage forms, of course, generally from about 10 to about 50% w./v. of the solution, expressed in terms of dihydrostreptomycin base. Other substances commonly included in pharmaceutical formulations of this type may also be added, if desired, in the quantities customarily employed, for instance, preservatives like phenols or an ester of p-hydroxybenzoic acid.

The solution containing the active ingredient is preferably buffered at approximately pH 6–8 and generally pH 7 prior to the addition of the reducing agents. The buffering is accomplished through the use of a therapeutically nontoxic buffering agent; e.g., sodium citrate, sodium acetate, sodium dihydrogen phosphate, etc. Generally about 1.5 to 3.0% of sodium citrate is satisfactory. If another buffer is used, the amount may be varied. The sodium phosphite and sodium formaldehyde sulfoxylate are then either premixed in an aqueous medium and added to the antibiotic salt solution, or added separately and in any order directly to the antibiotic solution. These operations are preferably carried out at room temperature.

If the aqueous solution containing the active ingredient and the reducing agents is heated at a temperature of about 75 to 100° C. for 15 minutes to 30 minutes the resulting solution shows a markedly decreased tendency to form a sediment. This treatment also helps to remove any microorganisms that are not killed by the dihydrostreptomycin or preservatives. In fact, the solution may be heat sterilized if desired, although sterilization by filtration may also be used. Generally the higher the temperature chosen, the shorter the time, and vice versa. For example, the solution may be heated for as little as 15 minutes at 100° C. The solution possesses such remarkable heat stability that it can be subjected for considerably longer periods of time to high temperatures without suffering any loss of potency and without producing undesirable color formation, e.g. 40 hours at 100° C. although there is no particular advantage to such prolonged treatment. Prior art and other control solutions, to the contrary, containing only one or none of the two reducing agents, darkened or charred and suffered severe losses in potency, when heated 40 hours at 100° C. After shelf storage for three months these controls had developed heavy turbid sediment, while the heated solutions of the present invention remained clear and 100% potent. Heat treatment of the stabilized solutions of the present invention is not essential since a remarkable stabilization is achieved without it, however, heat treatment is beneficial particularly in delaying formation of turbidity in the solutions.

Certain other therapeutic agents may also be present in the stabilized aqueous solutions of dihydrostreptomycin of this invention. In particular water-insoluble forms of penicillin are useful. These include such compounds as procaine penicillin and dibenzylethylene diamine penicillin. When a water-insoluble penicillin is included in the preparations there is, of course, no necessity to heat the mixtures, since the formation of some sediment from the dihydrostreptomycin is not seriously deleterious. In general, the penicillin salts are used at concentrations ranging from about 200,000 to 600,000 penicillin units per milliliter.

The following examples are given simply to illustrate this invention and not in any way to limit its scope.

Example I 100 cc. of an aqueous solution of dihydrostreptomycin sulfate containing the equivalent of 40 grams of dihydrostreptomycin base were buffered at pH 7 with sodium citrate. 4 grams of sodium phosphite (as anhydrous salt) and 0.40 gram of sodium formaldehyde sulfoxylate were added to the solution. Samples of the resultant solution were subjected to temperatures of 100° C. for 30 minutes, 100° C. for 15 minutes and one sample was not heated. Control samples not containing the phosphite-sulfoxylate combination were given the same types of treatment. The samples were stored at room temperature and observed for sediment formation. In the control samples sediment appeared after 3 days (no heat), 19 days (100° C. for 15 min.) and 22 days (100° C. for 30 min.), respectively. The stabilized samples showed sediment after 21 days (no heat), 6 months (100° C. for 15 min.) and 7 months (100° C. for 30 min.), respectively.

Example II

Dihydrostreptomycin sulfate equivalent to 40 grams of dihydrostreptomycin base was dissolved in water and the volume was made up to 100 ml. To this solution was added sodium phosphite pentahydrate equivalent to 4.0 g. of the anhydrous salt, and 0.4 g. of sodium formaldehyde sulfoxylate. Samples were stored at 75° C. At the end of 2 weeks there was an average retention of greater than 98% of the biological activity of the solution. A solution stabilized by one method used in the prior art (0.1% w./v. sodium bisulfite, 0.15% w./v. sodium formaldehyde sulfoxylate, 0.25 w./v. phenol) lost all of its biological potency under the same condition. The solution made according to the present invention retained over 89% of its biological activity after 6 weeks at 75° C.

*Example III*

The preparation described in Example I was repeated but the heat treatment step was omitted. The resulting solutions were highly stable as to color and biological potency, however, a fine sediment separated from the solution after storage for several weeks. This did not interfere with the use of the product in therapy.

*Example IV*

A solution of 20 grams of sodium phosphite pentahydrate (equivalent to about 11.6 grams on an anhydrous basis) in 80 grams of pyrogen-free water was sterilized by Seitz filtration. 3.7 grams of sterile sodium formaldehyde sulfoxylate and 327 g. of sterile dihydrostreptomycin sulfate (765 mcg. base activity per mg.) was dissolved in 500 ml. of water containing 0.15 g. of butyl p-hydroxybenzoate. The phosphite solution was then added. 12.6 g. of sodium citrate was added and the pH was adjusted to 6.5 with dilute sodium hydroxide. 5.0 g. of sterile polyvinyl pyrrolidone and 2.5 g. of sterile lecithin were then added. 204 g. of finely divided sterile procaine penicillin was gradually added, agitating the mixture sufficiently to obtain a smooth suspension. The mixture was then passed through a homogenizer after dilution with sterile water to 1 liter. All operations were handled under aseptic conditions. The suspension was then subdivided and bottled. The suspension, containing the equivalent of about 25% w./v. dihydrostreptomycin base and about 200,000 penicillin units per ml., proved highly stable on storage.

What is claimed is:

1. A process for preparing a stable pharmaceutical preparation which comprises forming an aqueous solution containing dihydrostreptomycin sulfate equivalent to from about 10 to about 50% w./v. of dihydrostreptomycin base, maintaining the solution at approximate neutrality, and adding between about 1% and about 8% w./v. of sodium phosphite on an anhydrous basis and between about 0.1 and about 0.8% w./v. of sodium formaldehyde sulfoxylate.

2. The process of claim 1 wherein the resultant solution is heated for from about 15 minutes to 30 minutes at between about 75° C. and 110° C.

3. The process of claim 1 wherein a water-insoluble salt of penicillin is suspended in the aqueous solution.

4. A stable pharmaceutical preparation comprising a substantially neutral, aqueous solution of dihydrostreptomycin sulfate and from about 1 to about 8% w./v. of sodium phosphite and from about 0.3 to about 0.5% w./v. of sodium formaldehyde sulfoxylate.

5. A preparation as claimed in claim 4 which has been heated for from about 15 minutes to about 30 minutes at between about 75° C. and about 110° C.

6. A stable pharmaceutical preparation comprising a substantially neutral, aqueous solution containing dihydrostreptomycin sulfate equivalent to about 25% w./v. dihydrostreptomycin base, procaine penicillin equilavent to about 200,000 penicillin units per ml., about 1% w./v. sodium phosphite and about 0.4% w./v. sodium formaldehyde sulfoxylate.

References Cited in the file of this patent

UNITED STATES PATENTS

| | | |
|---|---|---|
| 2,445,366 | Rigby | July 20, 1948 |
| 2,473,339 | Kirchmeyer et al. | June 14, 1949 |
| 2,657,171 | Macek et al. | Oct. 27, 1953 |
| 2,719,812 | Hanus | Oct. 4, 1955 |
| 2,720,482 | Bryan et al. | Oct. 11, 1955 |

OTHER REFERENCES

Dale et al.: J. A. Ph. A. (Prac. Pharm. Ed.), vol. 18, No. 7, July 1957, pp. 421–425.